US009537931B2

(12) United States Patent
Nguyen et al.

(10) Patent No.: US 9,537,931 B2
(45) Date of Patent: Jan. 3, 2017

(54) DYNAMIC OBJECT ORIENTED REMOTE INSTANTIATION (71) Applicant: Red Hat, Inc., Raleigh, NC (US)

(72) Inventors: Filip Nguyen, Brno (CZ); Filip Eliáš, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 13/953,404

(22) Filed: Jul. 29, 2013

(65) Prior Publication Data
US 2015/0032789 A1 Jan. 29, 2015

(51) Int. Cl.
H04L 29/08 (2006.01)
(52) U.S. Cl.
CPC .................... H04L 67/10 (2013.01)
(58) Field of Classification Search
CPC .......... H01L 67/10; H01L 41/00; H01L 43/00;
H01L 51/00; H01L 61/00; H01L 65/00;
H01L 67/00; H01L 69/00; G06F 8/451;
G06F 9/465; G06F 9/548
See application file for complete search history.

(56) References Cited

U.S. PATENT DOCUMENTS

| 6,205,465 | B1 | 3/2001 | Schoening et al. |
| 6,553,428 | B1 | 4/2003 | Ruehle et al. |
| 8,255,889 | B2 | 8/2012 | Stefansson et al. |
| 8,364,908 | B2* | 1/2013 | Barsness ............ G06F 9/5022 709/224 |
| 2006/0130034 | A1* | 6/2006 | Beisiegel ............ G06F 9/445 717/166 |
| 2014/0282614 | A1* | 9/2014 | Warren .............. G06F 9/465 719/316 |

FOREIGN PATENT DOCUMENTS

WO    WO9853398 A1    11/1998
WO    WO2011140201 A1    11/2011

OTHER PUBLICATIONS

Chuck Mcmanis, Java Indepth, Oct. 1, 1996.*
Joseph Kulandai, Java Annotations, Mar. 6, 2012.*
Pascale Launay and Jean-Louis Pazat; "A Framework for Parallel Programming in Java;" Dec. 1997; No. 3319; Theme 1; pp. 1-13; INRIA; Institut National De Recherche En Informatique Et En Automatique; http://hal.inria.fr/docs/00/07/33/70/PDF/RR-3319.pdf.
M. Aldinucci; M. Danelutto and P. Teti; "An Advanced Environment Supporting Structured Parallel Programming in Java;" Jul. 2003; Future Generation Computer Systems 19; pp. 611-626; Elsevier Science B.V.; http://www.sciencedirect.com/science/article/pii/S0167739X02001723.

* cited by examiner

Primary Examiner — Hitesh Patel
Assistant Examiner — Billy H Ng
(74) Attorney, Agent, or Firm — Haynes and Boone, LLP (57) ABSTRACT An example system for distributing a workload of an application includes a class identifier that identifies a remotely instantiable class in an instruction. Execution of the instruction includes processing a workload. The example system also includes a distributor that selects a remote node to process a portion of the workload, sends a message to the selected remote node to cause (i) the selected remote node to instantiate the remotely instantiable class and (ii) the selected remote node to process the portion of the workload by invoking a method of the instantiated class, and receives a result of the processed portion of the workload.

18 Claims, 4 Drawing Sheets

FIG. 4

DYNAMIC OBJECT ORIENTED REMOTE INSTANTIATION

BACKGROUND

A distributed computation may be performed on distributed computing devices. Certain computations (e.g., parallel processing or parallel programming) may benefit from using the distributed computing devices. For example, a complex computation may run faster if the computation is divided into portions and the portions are run on a number of processing devices. A node executing an application may determine how the application should be divided and what application portions go to which distributed computing systems. The distributed computing systems may receive instructions and/or data from the node and may return a result to the node.

BRIEF SUMMARY

It may be desirable to parallelize computations, especially when working with complex data and large data sets. This disclosure relates to distributing a workload for processing one or more instructions in an application. Methods, systems, and techniques for distributing the workload are provided.

According to an embodiment, a system for distributing a workload of an application includes a class identifier that identifies a remotely instantiable class in an instruction. Execution of the instruction includes processing a workload. The system also includes a distributor that selects a remote node to process a portion of the workload, sends a message to the selected remote node to cause (i) the selected remote node to instantiate the remotely instantiable class and (ii) the selected remote node to process the portion of the workload by invoking a method of the instantiated class, and receives a result of the processed portion of the workload.

According to another embodiment, a method of distributing a workload of an application includes identifying a remotely instantiable class in an instruction. Execution of the instruction includes processing a workload. The method also includes selecting a remote node to process a portion of the workload. The method further includes selecting a remote node to process a portion of the workload. The method also includes sending a message to the selected remote node to cause (i) the selected remote node to instantiate the remotely instantiable class and (ii) the selected remote node to process the portion of the workload by invoking a method of the instantiated class. The method further includes receiving a result of the processed portion of the workload.

According to another embodiment, a non-transitory machine-readable medium includes a plurality of machine-readable instructions that when executed by one or more processors are adapted to cause the one or more processors to perform a method including: identifying a remotely instantiable class in an instruction, where execution of the instruction includes processing a workload; selecting a remote node to process a portion of the workload; sending a message to the selected remote node to cause (i) the selected remote node to instantiate the remotely instantiable class and (ii) the selected remote node to process the portion of the workload by invoking a method of the instantiated class; and receiving a result of the processed portion of the workload.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

II. Example System Architecture

Figure 1:
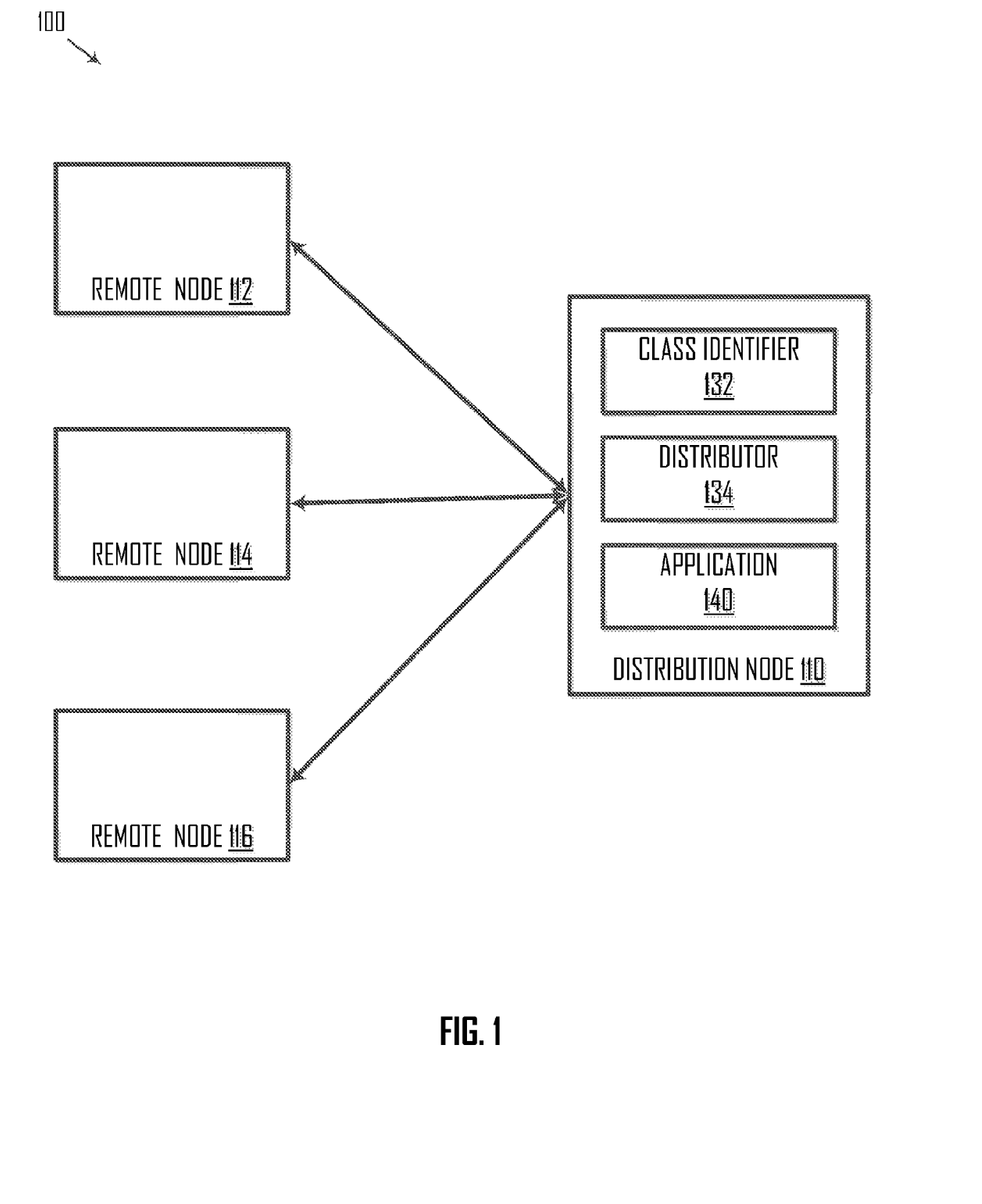
FIG. 1 is a simplified block diagram illustrating a system for distributing a workload, according to an embodiment.

FIG. 1 is a simplified block diagram 100 illustrating a system for distributing a workload, according to an embodiment.

Diagram 100 includes a distribution node 110 and remote nodes 112, 114, and 116. Although three remote nodes are illustrated, other embodiments including fewer than or more than three remote nodes are within the scope of the present disclosure. The remote nodes and distribution node 110 may be coupled to a network. Remote nodes 112, 114, and 116 may be remote with respect to distribution node 110 and may communicate with distribution node 110 over the network.

Each of distribution node 110 and remote nodes 112, 114, and 116 may be implemented on a computing device that includes a memory and a processor. Distribution node 110 and remote nodes 112, 114, and 116 may be implemented on different computing devices and may be separated by the network. The network may include various configurations and use various protocols including the Internet, World Wide Web, intranets, virtual private networks, wide area networks, local networks, private networks using communication protocols proprietary to one or more companies, Ethernet, WiFi and HTTP, and various combinations of the foregoing.

In an example, each of distribution node 110 and remote nodes 112, 114, and 116 may be an operating system or a virtual machine running on a computing device. A virtual machine is a software implementation of a machine that may execute programs. In an example, the virtual machine may be a JAVA® virtual machine. Trademarks are the property of their respective owners.

Distribution node 110 may execute an application 140 that is written in a high-level programming language. In an example, application 140 is written in an object-oriented programming language that defines classes. A data object may be a self-contained entity that has state and behavior and represents an instance of a class. The data object's state may be described as its fields and properties, and the data object's behavior may be described by its methods and events. Application 140 may include code that creates instances of a class, and an instance of a particular class may expose methods and properties defined by that class. In an example, an instruction in application 140 may include an operator that creates an instance of a class. For example, the instruction may include the "new" keyword, which is a JAVA® operator that creates an instance.

Application 140 may be, for example, a JAVA® application or a C++ application. Although the present disclosure may describe the application as being a JAVA® application, it should be understood that the techniques in the disclosure apply to any object-oriented programming language.

Application 140 may be an application that a user submits to distribution node 110 for workload distribution among one or more remote nodes. Execution of the instruction may include processing an amount of work referred to as a workload. The instruction may cause one or more remotely instantiable classes to be invoked. A remotely instantiable class may refer to a class that may be instantiated at a node running remotely from a particular node executing application 140. For example, if distribution node 110 executes application 140, a remotely instantiable class may be instantiated at remote nodes 112, 114, and/or 116. The application may include a main method including a computation and classes and have its main entry point at distribution node 110. Distribution node 110 may cause the deployment of one or more auxiliary instances that are remotely instantiable on one or more remote nodes. In an example, application 140 is a JAVA® application, and distribution node 110 may issue a signal to start the main method of the JAVA® class by, for example, using standard JAVA® binary.

In an embodiment, distribution node 110 uses a distributed object model to distribute the processing of the workload associated with application 140. Application 140 may execute at distribution node 110, and portions of the workload may be divided on an object basis and sent to a remote node different from distribution node 110. In this way, rather than carry out a computation on distribution node 110, the computation may be carried out in a distributed fashion on different computers (e.g., remote nodes 112, 114, and/or 116) that are separated by a network. Distributing a workload may refer to distribution node 110, the node executing application 140, sending a portion of the workload to another node for processing.

A daemon may execute on each of distribution node 110 and remote nodes 112, 114, and 116, and provide a service in the background while a program is running. The daemon may be started by an administrator by, for example, starting a process on a given node that will host the daemon. The daemon may listen for remote connections. In an example, a daemon executing on a remote node may listen for a remote connection to determine whether to perform work for distribution node 110.

Distribution node 110 includes a class identifier 132 and distributor 134. In an embodiment, class identifier 132 identifies a remotely instantiable class in an instruction of application 140. Class identifier 132 may identify the remotely instantiable class during runtime of the application. Class identifier 132 may determine that a class is remotely instantiable because the class has been marked as being remotely instantiable. A class may be marked as being remotely instantiable in a variety of ways. In an example, a definition may define a class and include an annotation indicating that the class is remotely instantiable.

Table A at line 1 illustrates an example annotation in a class definition indicating that the class is remotely instantiable.

TABLE A

| @RemoteInstantiable //line 1 |
| public class Greeter { |
|     public int power (int x) { |
|       return Math.pow(x, x);}} |

Table A illustrates an example class definition of a Greeter class. The class definition of the Greeter class defines the class and includes at line 1 an annotation "@RemoteInstantiable" that may indicate to distribution node 110 that the particular class is remotely instantiable. The Greeter class is a public class that computes a power of a number.

Other ways to indicate a class as being remotely instantiable are within the scope of the disclosure. In another example, distribution node 110 has a list that includes classes that are remotely instantiable. When distribution node 110 executes application 140, distribution node 110 may determine whether the class is remotely instantiable by checking the list.

Further, an instruction may cause one or more remotely instantiable classes to be instantiated, and the one or more remotely instantiable classes may be of the same class type or of different class types.

Table B illustrates an example instruction that may be included in application 140 and that causes the instantiation of the Greeter class twice.

TABLE B

System.out.println(new Greeter( ).power(152) + new Greeter( ).power(140))

In Table B, the remotely instantiable classes included in the example instruction is of the same class type, the Greeter class type. In another example, however, the instruction may include remotely instantiable classes that are of different class types (e.g., a Greeter class and a Silent class). Further, the instruction may cause fewer than or more than two remotely instantiable classes to be instantiated.

The example instruction prints out a sum of $152^{152}$+ $140^{140}$. A user may desire to compute the sum of $152^{152}$+ $140^{140}$ and include an instruction to do so into the main method of application 140. The user may then submit application 140 to distribution node 110 to execute the application. To initiate processing of the example instruction, distribution node 110 may start to execute the inner part of System.out.println( ). Class identifier 132 may identify the Greeter class as being a remotely instantiable class in the instruction, triggering distribution node 110 to cause the remotely instantiable class to be instantiated at a node remote from distribution node 110. Distribution node 110 may distribute the workload for the instruction to be processed on one or more remote nodes. For example, for each remotely instantiable class in the instruction, distribution node 110 may select a remote node to process a portion of the workload.

In an embodiment, distributor 134 selects a remote node to process a portion of the workload. Distribution node 110 may dynamically select a remote node from one or more remote nodes. The one or more remote nodes may be within a cluster common to distribution node 110. Distribution node 110 and the remote nodes may be established as a cluster in a variety of ways. In an example, an administrator may manually set up the cluster to include distribution node 110 and the remote nodes. The administrator may start distribution node 110 and the remote nodes and pair them together by configuration. For example, the administrator may place an identifier (e.g., Internet Protocol (IP) address or media access control (MAC) address) of each remote node into a configuration file at distribution node 110. In this way, distribution node 110 is aware of the remote nodes within its cluster and may determine to which remote node from the cluster to send a portion of the workload for processing.

In an example, distribution node 110, remote node 112, and remote node 114 are within a common cluster. Accordingly, distribution node 110 may distribute a portion of the workload to execute an instruction to remote node 112 and another portion of the workload to execute the instruction to remote node 114. As such, a plurality of remote nodes may help in processing the workload for an instruction, and distribution node 110 may outsource this work rather than perform the work itself. Distribution node 110 may submit one or more portions of the workload to the selected remote node. It may be faster to arrive at a solution by selecting different remote nodes to process portions of the workload.

Distributor 134 may also select a remote node based on various factors, such as available resources (e.g., memory and CPU usage) of the remote node or cost of using the remote node. Statistics may be checked, such as how big a load is on a specific remote node. In an example, if remote node 112 is idle or has the most available resources compared to remote node 114, distributor 134 may select remote node 112 to process a portion of the workload. This is not intended to be limiting and more complicated techniques may be used to select the remote node to process a portion of the workload for the instruction. The use of more complicated techniques to select a remote node may be beneficial when, for example, hundreds of remote nodes are within a cluster common to distribution node 110. Further, the computational complexity of the workload may be determined and the remote nodes to process portions of the workload may be selected based on the computational complexity of the workload.

At the remote node, processing the particular portion of the workload may include instantiating the remotely instantiable class included in the instruction. In an example, distribution node 110 does not instantiate the class but rather leaves it up to the remote node to do so. In an embodiment, distribution node 110 sends a message to the selected remote node to cause (i) the selected remote node to instantiate the remotely instantiable class and (ii) the selected remote node to process the portion of the workload by invoking a method of the instantiated class. An advantage of remotely instantiating the class may provide for better memory consumption on a single machine (e.g., distribution node 110).

The message sent to the remote node may include a textual representation of the remotely instantiable class and the particular method of the remotely instantiable class to invoke. In an example, the message is a remote method invocation. Responsive to the message, the selected remote node may process a portion of the workload by invoking the particular method of the instantiated class and performing the appropriate computation.

In an embodiment, the one or more classes running remotely on the selected remote node have no side effects and do not leverage resources (e.g., files or executables) local to distribution node 110. In particular, if the selected remote node instantiates a class, the remote node does not expect resources from distribution node 110. Any such resource(s) may be sent via parameter(s) to the remotely instantiable class. A resource may be, for example, a connection to a service (e.g., database connection) or file system mount point.

Remote nodes may lack a database connection so the class to be instantiated on the remote node may not expect to have any database connections. When leveraging database connections, a remote node may use Java Naming Directory Interface (JNDI) lookup to look up those connections. If the selected remote node wants to perform processing based on data that is stored in the database associated with the database connection, distribution node 110 may send the database connection via one or more parameters to the selected remote node. In an example, distribution node 110 may send a connection string and credentials associated with the database connection to the selected remote node. Additionally, output streams (e.g., System.out) may not be used by the remotely instantiable class.

In an example, a remote node is a virtual machine that instantiates classes by using a class loader. A class loader enables a virtual machine to load classes. Given the name of a class, the class loader may locate the definition of the class. The class loader may refer to an abstract class that describes how classes are loaded. In an example, a JAVA® application may create subclasses that extend the ClassLoader class, implementing its methods. Doing so enables classes to be loaded in some way other than the way they would normally be loaded by the runtime system.

When the remote node starts up, the class loader in the remote node may be registered as the main class loader for the daemon executing in the remote node. The daemon on the remote node may be instructed to set its class loader to the Delegating ClassLoader. The class loader used for the remote node may be wrapped with the Delegating ClassLoader used for distribution node 110. This may redirect class resolution to distribution node 110. Delegation may refer to a class loader delegating class loading to its parent before trying to load the class itself. Accordingly, a class loaded by a specific class loader may only reference classes that this class loader or its parents can load, but not its children. When the remote node receives a portion of a workload to process for distribution node 110, the parent thread executing on the remote node will feature the class. It may be unnecessary for distribution node 110 to feature the class loader because distribution node 110 submits the work associated with the remotely instantiable class to one or more remote nodes. Because the one or more remote nodes processes portions of the workload but does not already have the information to carry out how to process the workload, the one or more remote nodes may load the class loader via a remote class loader.

Figure 2:
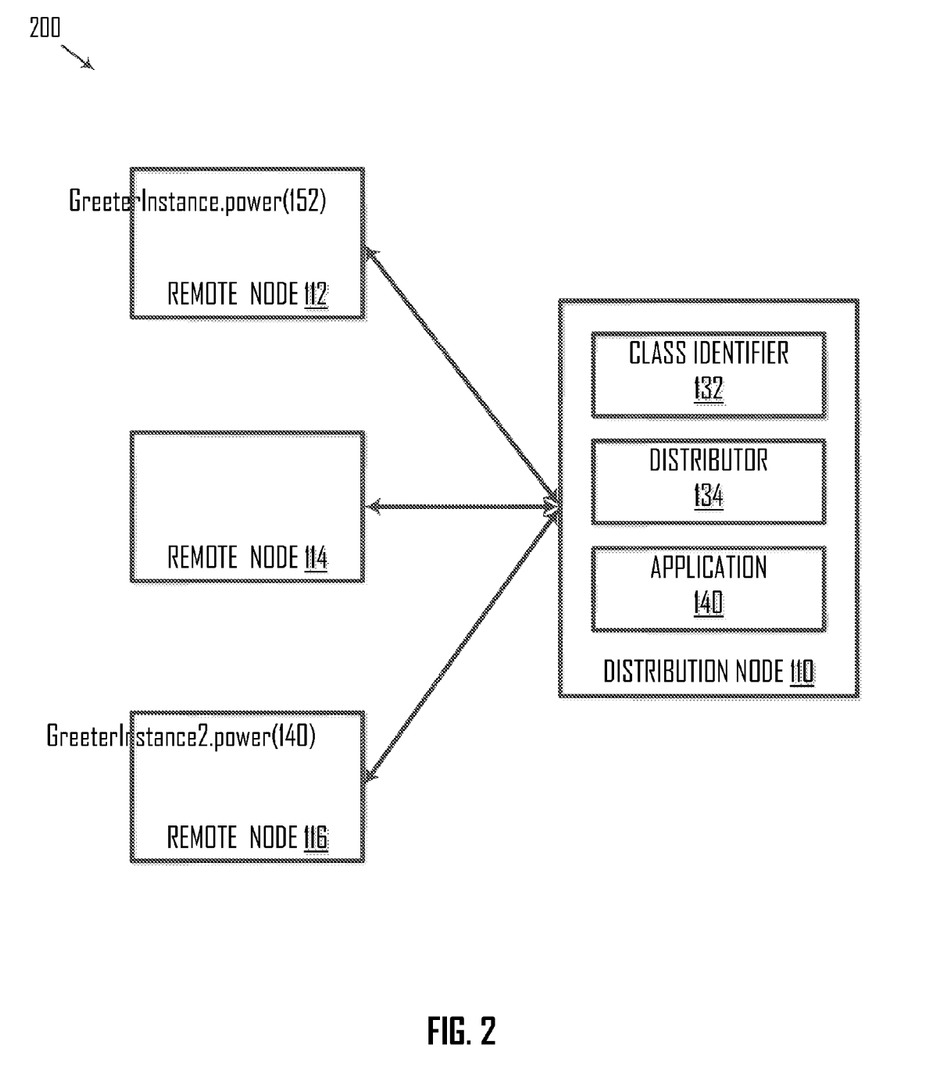
FIG. 2 is a simplified block diagram 200 illustrating remote nodes instantiating a remotely instantiable class to process a portion of workload, according to an embodiment.

Referring back to Table B, the workload for the example instruction may be distributed to different remote nodes that instantiate a remotely instantiable class. FIG. 2 is a simplified block diagram 200 illustrating remote nodes instantiating a remotely instantiable class to process a portion of the workload for the instruction in Table B, according to an embodiment. Portions of the workload for instruction execution may correspond to each instance of a remotely instantiable class to be invoked. For example, a first portion of the workload may include processing "Greeter( ).power(152), and a second portion of the workload may include processing "Greeter( ).power(140). In diagram 200, distribution node 110 may send the first portion to remote node 112 and the second portion to remote node 116.

Distributor 134 may send a message to remote node 112 to cause remote node 112 to instantiate the Greeter class. The message may include the class name to instantiate (e.g., Greeter), the particular class method to invoke (e.g., power (int x)), and parameters that are used by the particular class method (e.g., 152). Remote node 112 may use its class loader to resolve the Greeter class into an instance GreeterInstance of the Greeter class. Remote node 112 may process the first portion of the workload by using Greeterinstance to invoke the power method of the Greeter class with 152 as a parameter. Remote node 112 may then process the computation of 152 to the power of 152 and obtain the result of the computation.

Distribution node 110 may also select a remote node to process the second portion of the workload. Remote node 112's resources may have changed based on the processing of the first portion of the workload. Accordingly, distribution node 110 may select a remote node different from remote node 112, such as remote node 114 or 116 to process the second portion of the workload. Alternatively, distribution node 110 may decide to send the second portion of the workload to remote node 112 for processing.

In diagram 200, distribution node 110 sends the second portion of the workload to remote node 116. Distributor 134 may send a message to remote node 116 to cause remote node 116 to instantiate the Greeter class. The message may include the class name to instantiate (e.g., Greeter), the particular class method to invoke (e.g., power(int x)), and parameters that are used by the particular class method (e.g., 140). Remote node 116 may use its class loader to resolve the Greeter class into an instance GreeterInstance2 of the Greeter class. The instance GreeterInstance is different from the instance GreeterInstance2 of the Greeter class. As illustrated in FIG. 1, different instances may be part of one running application. Remote node 116 may process the second portion of the workload by using GreeterInstance2 to invoke the power method of the Greeter class with 140 as a parameter. Remote node 116 may then process the computation of 140 to the power of 140 and obtain the result of the computation.

When Greeterinstance or GreeterInstance2 is to be called, distribution node 110 may contact the selected remote node via, for example, remote method invocation (RMI) or hypertext transfer protocol (HTTP) and inform the selected remote node that the particular method (e.g., power(int x)) of the Greeter class is to be invoked. While the computation(s) are being carried out, the nodes in the cluster may continue running, along with the daemons on each node.

The selected node that performs a portion of the workload may return the result to distribution node 110. Distribution node 110 may receive the one or more results of the processed portion of the workload. In keeping with the above example, distributor 134 may receive the result of the first portion of the workload from remote node 112 and the result of the second portion of the workload from remote node 116, and execute the instruction by adding the two results together and printing out the result of the computation. Distributor 134 may wait for all results to come back before the instruction can be executed. Accordingly, if an instruction causes N instances of one or more remotely instantiable classes to be instantiated and distributor 134 sends out N portions of the workload for processing, distributor 134 may complete execution of the instruction after receiving the results of the processed N portions of the workload.

The application code may or may not run sequentially. Even though the code does not run sequentially, an advantage of improved memory consumption may still be realized. As discussed, although two remotely instantiable classes are shown in the instruction in Table B, an instruction may include fewer than or more than two remotely instantiable classes. In a real world scenario, instances of the Greeter class may be called many more times and may consume a lot of memory. Running the code in parallel may improve the overall usability in many scenarios.

In an example, remote node 112 is a JAVA® virtual machine, and a new keyword or interface is introduced. The new keyword may help run code on different machines in parallel and may be translated into the native JAVA® language. It may be unnecessary to compile the keyword into JAVA® bytecode. Rather, the new keyword may be preprocessed into standard JAVA® (e.g., Java Development Kit 6). In an example, the keywords "parallel" and "parallel Wait" are added to the JAVA® programming language to parallelize the processing of the workload.

Table C illustrates the usage of the keywords "parallel" and "parallelWait" for implementing an example merge sort program.

TABLE C

```
@RemoteInstantiable
public class Sorter {
public List<Integer> sort(List<Integer> integers) {
if (integers.size( ) <= 1)
return integers;
List<Integer> firstHalf = integers.subList(0,integers.size( )/2);
List<Integer>secondHalf= integers.subList(firstHalfsize( ),
integers.size( )–1);
parallel(1) {                              //line 8
return new Sorter( ).sort(firstHalf);      // line 9
}
parallel(1) {                              // line 11
return new Sorter( ).sort(secondHalf);     // line 12
}
parallelWait( );
firstHalf = parallel(1);
secondHalf = parallel(2);
return merge(firstHalf,secondHalf);}}
```

Multiple threads may execute the example code in Table C in parallel. For example, a program may start multiple threads of execution that will run in parallel to execute the example code. The parallel Wait keyword may ensure that all parallel blocks are done before retrieving the results and continuing in the computation. Further, instantiating the Sorter functions at lines 9 and 12 may cause the distribution of the computation to different machines.

The translation of the example code to native JAVA® may include exchanging each parallel usage with its label for a subclass of the Thread class with exactly one result. The subclass of the Thread class may be thought of as an anonymous thread class enabling code to run in a different thread. The content of the code block may be inserted into the extended thread run method. For example, "parallel(1)" at lines 8 and 11 may be replaced with a subclass of the Thread class that translates the parallel keyword to JAVA® native code. As such, "parallel(1)" at line 8 may be replaced, for example, by a thread class that executes the Sorter function in a different thread. The translation of the example code to native JAVA® may also include upon parallelWait joining all the existing, running, and/or parallel threads. Using parallel(label) without a code block may retrieve the result.

As discussed above and further emphasized here, FIGS. 1-2 are merely examples, which should not unduly limit the scope of the claims. In an example, although block diagrams 100 and 200 are described herein with reference to one distribution node that distributes the workload for an instruction, other embodiments including more than one distribution node are within the scope of this disclosure. In another example, although block diagrams 100 and 200 are described herein with one application running on the distribution node, other embodiments including more than one application running on the distribution node are within the scope of this disclosure. Moreover, it should be understood that one or more modules (e.g., class identifier 132 and distributor 134) in FIGS. 1-2 may be combined with another module. It should also be understood that one or more modules in FIGS. 1-2 (e.g., class identifier 132 and distributor 134) may be separated into more than one module.

IV. Example Method

Figure 3:
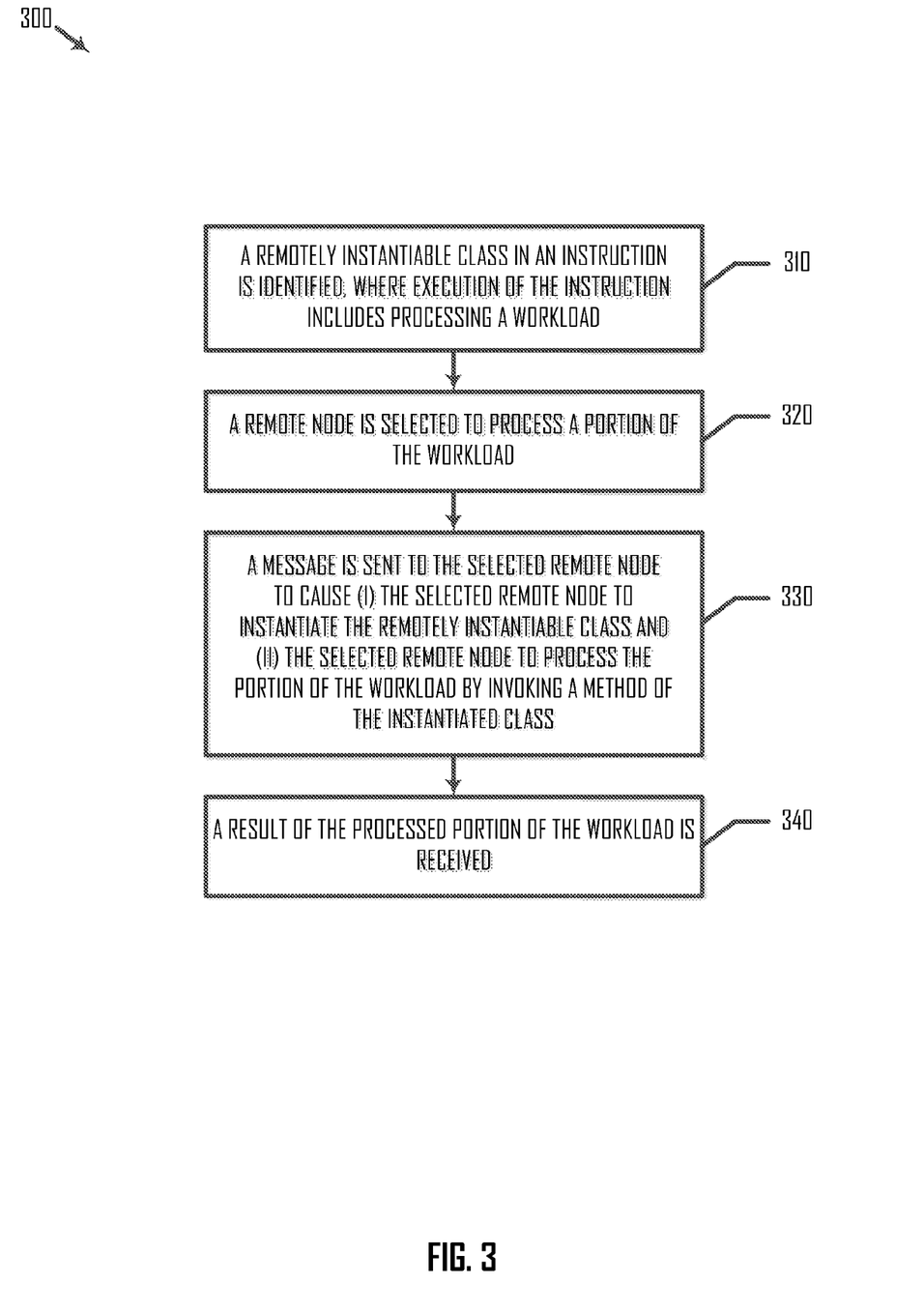
FIG. 3 is a simplified flowchart illustrating a method of distributing a workload, according to an embodiment.

FIG. 3 is a simplified flowchart illustrating a method of distributing a workload, according to an embodiment. Method 300 is not meant to be limiting and may be used in other applications.

Method 300 includes steps 310-340. In a step 310, a remotely instantiable class in an instruction is identified, where execution of the instruction includes processing a workload. In an example, class identifier 132 identifies a remotely instantiable class in an instruction, where execution of the instruction includes processing a workload.

In a step 320, a remote node is selected to process a portion of the workload. In an example, distributor 134 selects remote node 112 to process a portion of the workload.

In a step 330, a message is sent to the selected remote node to cause (i) the selected remote node to instantiate the remotely instantiable class and (ii) the selected remote node to process the portion of the workload by invoking a method of the instantiated class. In an example, distributor 134 sends a message to remote node 112 to cause (i) remote node 112 to instantiate the remotely instantiable class and (ii) remote node 112 to process the portion of the workload by invoking a method of the instantiated class.

In a step 340, a result of the processed portion of the workload is received. In an example, distributor 134 receives a result of the processed portion of the workload.

It is also understood that additional method steps may be performed before, during, or after steps 310-340 discussed above. It is also understood that one or more of the steps of method 300 described herein may be omitted, combined, or performed in a different sequence as desired.

V. Example Computing System

Figure 4:
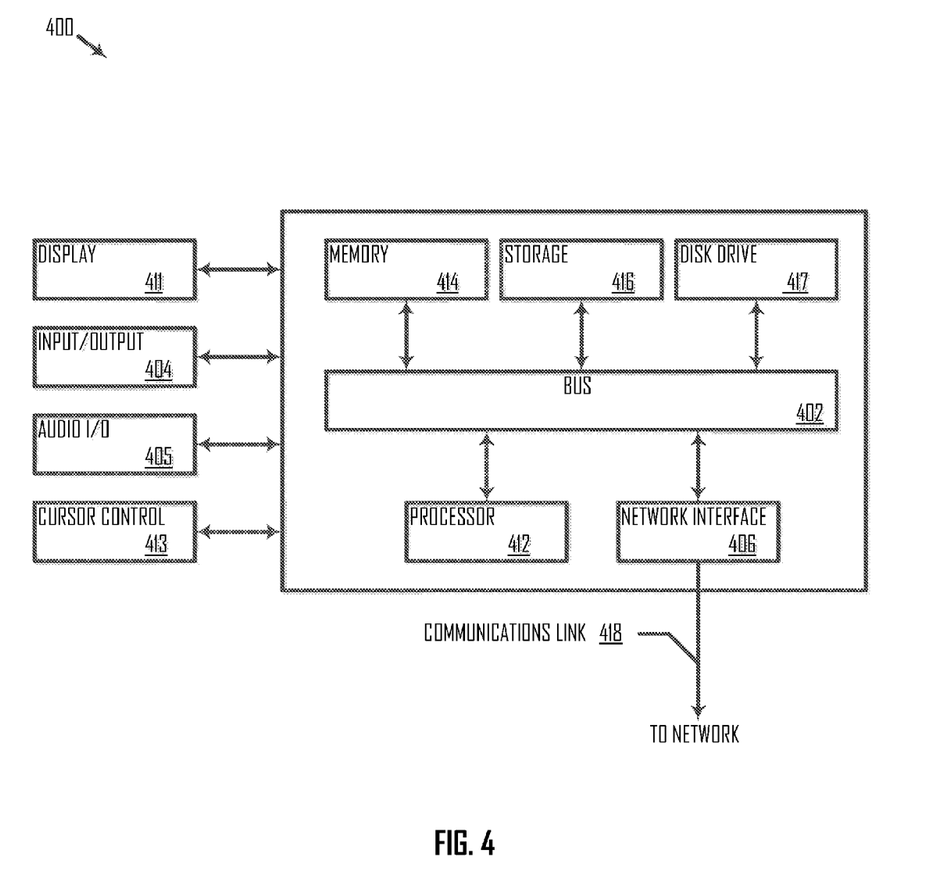
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, distribution node 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a microcontroller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for distributing a workload of an application, the system comprising:
   a memory that stores one or more instructions of an application;
   one or more hardware processors coupled to the memory and configured to read instructions from the memory;
   a class identifier that identifies, by the one or more hardware processors, a first remotely instantiable class an instruction of the one or more instructions stored in the memory, wherein execution of the instruction includes processing a first portion of a workload corresponding to the first remotely instantiable class and processing a second portion of the workload corresponding to a second remotely instantiable class; and
   a distributor that selects a first remote node to process the first portion of the workload, sends a first message to the first remote node to cause (i) the first remote node to instantiate the first remotely instantiable class included in the instruction and (ii) the first remote node to process the first portion of the workload by invoking a method of the first remotely instantiated class, and receives a first result of the processed portion of the first workload,
   wherein the distributor selects a second remote node to process the second portion of the workload, sends a second message to the second remote node to cause (i) the second remote node to instantiate the second remotely instantiable class included in the instruction and (ii) the second remote node to process the second portion of the workload by invoking a method of the second remotely instantiated class, and receives a second result of the processed portion of the second workload, and wherein the distributor executes the instruction using the first and second results; and
   wherein the first remote node includes a first virtual machine that instantiates classes by using a class loader that locates a definition of the first remotely instantiable class, wherein in response to the first remote node starting UP, the class loader is registered as a main class loader for a daemon executing in the first remote node, and the daemon sets its class loader to a delegating class loader, wherein the class loader used for the first remote node is wrapped with the delegating class loader used for a distribution node.

2. The system of claim 1, wherein the distribution node includes the class identifier and the distributor, wherein the distribution node, the first remote node, and the second remote node are in a common cluster and are each coupled to a network.

3. The system of claim 2, wherein the first remote node does not leverage resources local to the distribution node, and the distribution node sends the message, and the message includes one or more parameters including one or more resources.

4. The system of claim 3, wherein a resource of the one or more resources includes a database connection and credentials associated with the database connection.

5. The system of claim 3, wherein a resource of the one or more resources includes a file system mount point.

6. The system of claim 3, wherein the distribution node includes a second virtual machine.

7. The system of claim 1, wherein the first remote node loads the class loader to instantiate the first remotely instantiable class.

8. A method of distributing a workload of an application, the method comprising:
   identifying a first remotely instantiable class in an instruction, wherein execution of the instruction includes processing a first portion of a workload corresponding to the first remotely instantiable class and processing a second portion of the workload corresponding to a second remotely instantiable class;
   selecting a first remote node to process the first portion of the workload;
   selecting a second remote node to process the second portion of the workload;
   sending a first message to the first remote node to cause (i) the first remote node to instantiate the first remotely instantiable class included in the instruction and (ii) the first remote node to process the first portion of the workload by invoking a method of the first remotely instantiated class, wherein the first remote node includes a first virtual machine that instantiates classes by using a class loader that locates a definition of the first remotely instantiable class, wherein in response to the first remote node starting UP, the class loader is registered as a main class loader for a daemon executing in the first remote node, and the daemon sets its class loader to a delegating class loader, wherein the class loader used for the first remote node is wrapped with the delegating class loader used for a distribution node;
   sending a second message to the second remote node to cause (i) the second remote node to instantiate the second remotely instantiable class included in the instruction and (ii) the second remote node to process the second portion of the workload by invoking a method of the second remotely instantiated class;
   receiving a first result of the first processed portion of the workload;
   receiving a second result of the second processed portion of the workload; and
   executing the instruction using the first and second results.

9. The method of claim 8, further including:
executing an application including the instruction, wherein the identifying includes identifying the first remotely instantiable class during runtime of the application.

10. The method of claim 8, wherein the selecting the first remote node includes selecting a remote node based on memory or CPU usage of one or more remote nodes.

11. The method of claim 8, wherein the sending a first message includes sending a textual representation of the first remotely instantiable class and the method of the first remotely instantiable class to invoke.

12. The method of claim 8, wherein a definition defines the first remotely instantiable class and includes an annotation indicating that the first remotely instantiable class is remotely instantiable.

13. The method of claim 8, wherein the first remote node loads the class loader to instantiate the remotely instantiable class.

14. A non-transitory machine-readable medium comprising a plurality of machine-readable instructions that when executed by one or more processors is adapted to cause the one or more processors to perform a method comprising:
identifying a first remotely instantiable class and a second remotely instantiable class in an instruction, wherein execution of the instruction includes processing a first portion of a workload corresponding to the first remotely instantiable class and processing a second portion of the workload corresponding to a second remotely instantiable class;
selecting a first remote node to process the first portion of the workload;
selecting a second remote node to process the second portion of the workload;
sending a first message to the first remote node to cause (i) the first remote node to instantiate the first remotely instantiable class included in the instruction and (ii) the first remote node to process the first portion of the workload by invoking a method of the first remotely instantiated class, wherein the first remote node includes a first virtual machine that instantiates classes by using a class loader that locates a definition of the first remotely instantiable class, wherein in response to the first remote node starting UP, the class loader is registered as a main class loader for a daemon executing in the first remote node, and the daemon sets its class loader to a delegating class loader, wherein the class loader used for the first remote node is wrapped with the delegating class loader used for a distribution node;
sending a second message to the second remote node to cause (i) the second remote node to instantiate the second remotely instantiable class included in the instruction and (ii) the second remote node to process the second portion of the workload by invoking a method of the second remotely instantiated class;
receiving a first result of the first processed portion of the workload;
receiving a second result of the second processed portion of the workload; and
executing the instruction using the first and second results.

15. The system of claim 1, wherein the distributor divides workloads associated with an instruction on a per-object basis.

16. The method of claim 8, further comprising:
dividing workloads associated with the instruction on an object basis, wherein the dividing includes assigning the first portion of the workload to the first remote node and assigning the second portion of the workload to the second remote node.

17. The system of claim 1, wherein the instruction is written in a high-level programing language.

18. The system of claim 1, wherein the first remotely instantiable class is marked with an annotation, and the annotation indicates that the first remotely instantiable class is remotely instantiable.

\* \* \* \* \*